Patented Feb. 13, 1940

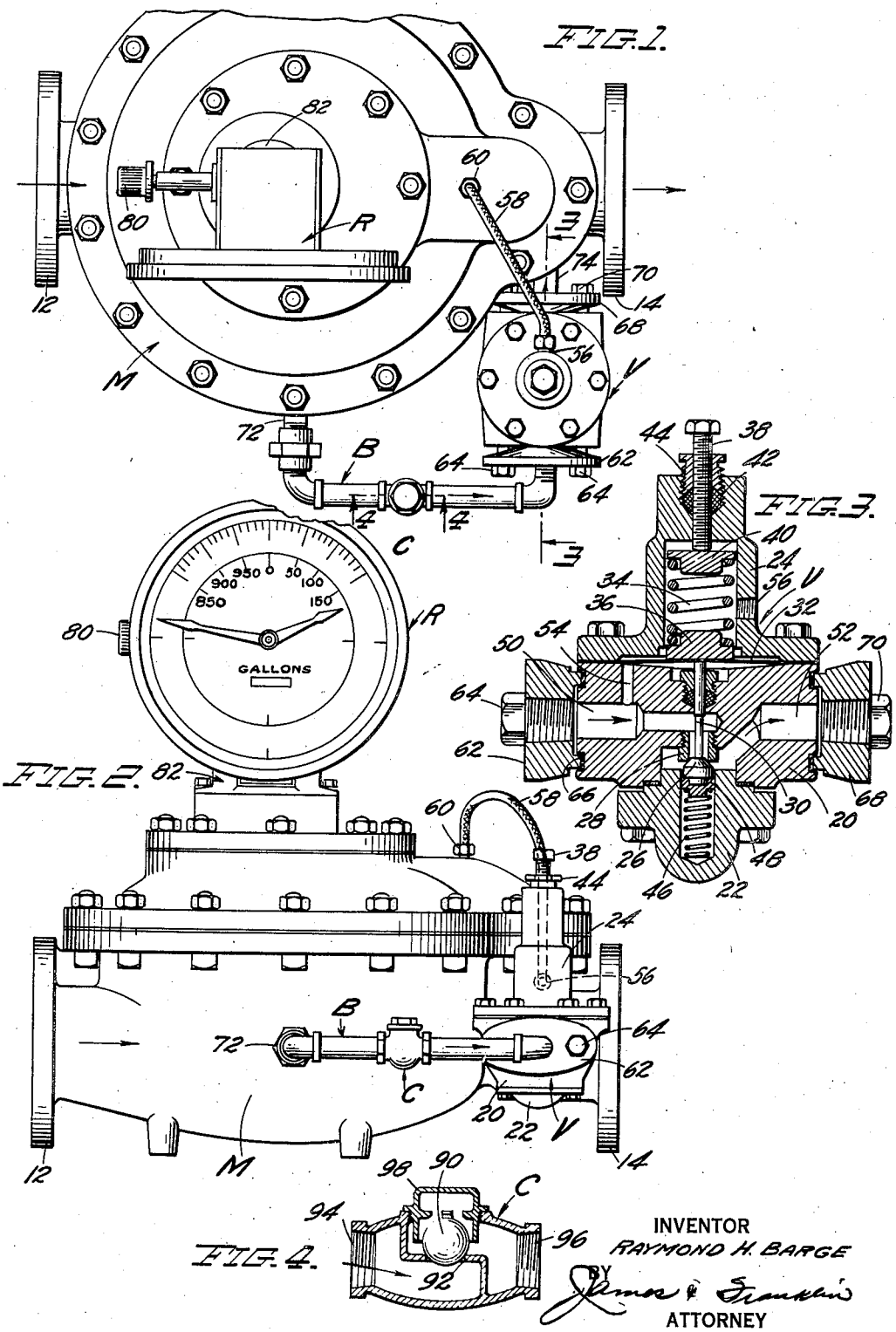

2,189,750

UNITED STATES PATENT OFFICE 2,189,750

BY-PASS COMPENSATOR FOR METERS

Raymond H. Barge, Mineola, N. Y., assignor to National Meter Company, Brooklyn, N. Y., a corporation of New York Application December 23, 1938, Serial No. 247,403

9 Claims. (Cl. 73—254)

This invention relates to meters, and more particularly to compensating means for improving the accuracy of such meters.

The object of the present invention is to generally improve meters, particularly liquid flow meters of the displacement or piston type. Such meters suffer from inaccuracy near maximum flow, the liquid then being forced through the meter under a high differential pressure. The reading of the meter errs on the low side, this error being equivalent to a leakage through the meter, or to a fractional flow which is shunted or by-passed around the meter. One important object of my invention is to overcome this difficulty. It is not feasible to actually do away with the error or leakage through the meter at maximum flow. Instead, I provide a by-pass conduit around the meter, this conduit being equipped with a valve which opens at moderate flow but closes at high flow. Thus, the meter is by-passed throughout substantially all of the range of flow, so that the response is made substantially uniform. The final reading of the register is a correct one, for the drive ratio between the meter and the register is appropriately selected for that result.

The broad idea of compensating a meter by means of a by-pass conduit is not itself new. However, such arrangements have heretofore been unsatisfactory because the valve controlling the flow through the by-pass conduit has not been dependable nor accurate in operation. In accordance with a further feature and object of the present invention, the by-pass conduit is provided with a pressure-controlled valve, said valve including a movable diaphragm for opening or closing the valve, means to apply the meter inlet pressure to one side of the diaphragm, means to apply the meter outlet pressure to the other side of the diaphragm, and a loading spring bearing against one side of the diaphragm and tending normally to open the valve. In this way, the valve is opened when the differential pressure across the meter is moderate, and is closed when the differential pressure across the meter is large, as at high flow rate.

A somewhat similar leakage error appears at exceedingly low rates of flow. This is due to the fact that a very slight flow of liquid through the meter fails to overcome the friction of the meter and register and therefore fails to sufficiently turn the meter. This error is of far less importance in practice than the error attendant upon high rate of flow. The reason for this is that a meter designed to operate up to, say, three hundred gallons per minute is seldom installed or used in a position where it might have to handle a flow of only a few gallons per minute. However, in rare instances where a correction is desired at exceedingly small flow, this result may be obtained by again stopping flow through the by-pass conduit at such flow. In the specific form here disclosed, the by-pass conduit is provided with a ball check valve arranged in series with the aforesaid pressure-controlled diaphragm operated valve. The check valve is so faced as to permit flow of liquid therethrough. However, at exceedingly small flow rate, the differential pressure across the meter is so slight that the weight of the ball of the check valve is itself sufficient to inhibit flow through the by-pass conduit.

To the accomplishment of the foregoing, and such other objects as may hereinafter appear, my invention consists in the by-passed meter and pressure-controlled valve elements, and their relation one to the other, as are hereinafter more particularly described in the specification and sought to be defined in the claims. The specification is accompanied by a drawing, in which:

Fig. 1 is a plan view showing a meter compensated in accordance with the present invention;

Fig. 2 is a front elevation thereof;

Fig. 3 is a vertical section through the diaphragm operated valve, and is taken in the plane of the line 3—3 of Fig. 1; and Fig. 4 is a vertical section through a ball check valve, and is taken in the plane of the line 4—4 of Fig. 1.

Referring to the drawing, and more particularly to Fig. 1, the invention as here exemplified comprises a meter M which drives a register R. The meter and register may be of conventional type, and the meter is provided with the usual flanged inlet passage 12 and outlet passage 14. A by-pass conduit B is provided in communication with the inlet and outlet sides of the meter. This by-pass includes and is controlled by a diaphragm operated or pressure-controlled valve generally designated V. The arrangement is such that at high rates of flow, the valve V is closed, but at moderate and low rates of flow the valve V is opened. The by-pass B may, if desired, also be provided with a check valve C, this check valve functioning to close the by-pass at extremely low rates of flow. The operation of the complete assemblage of valve mechanism is to close the by-pass conduit at extremely small flow and at high rates of flow, but to open the same at moderate rates of flow therebetween.

Considering the arrangement in greater detail, and referring now to Fig. 3, the valve V comprises a valve body 20 having a bottom 22 secured therebeneath and a head 24 secured thereabove. The valve element per se is a frustroconical member 26, or so-called poppet valve. This opens downwardly, and closes when moved upwardly against valve seat 28. The valve 26 is connected by means of a valve stem 30 to a flexible diaphragm 32. The periphery of the diaphragm is secured between the valve body 20 and the head 24 with a leak-proof fit. A loading spring 34 bears downwardly against diaphragm 32, the pressure of the spring being applied through a button 36. The pressure of the spring is preferably made variable, as by means of the adjusting screw 38, said screw being threadedly received in head 24, and its lower end bearing against a top button 40. Leakage around adjusting screw 38 may be prevented by means of packing 42 compressed by gland 44.

In order to avoid perforating the diaphragm 32, with possible resulting leakage, the diaphragm may simply rest on the upper end of valve rod 30, and the valve may normally be urged upwardly by means of a light compression spring 46 housed in bottom member 22 and bearing at its upper end on a piston 48 which in turn moves against the valve member 26.

The inlet passage of the valve is indicated at 50, and the outlet passage at 52. The inlet pressure is applied to the lower side of diaphragm 32, as by means of the connection or port 54. The discharge or outlet pressure of the meter is applied to the upper side of the diaphragm through threaded opening 56 in the valve head 24. Reverting to Figs. 1 and 2, it will be seen that the opening 56 is connected by means of a preferably flexible tube 58 to any convenient point on the meter body, such as the point 60 which leads into the discharge side of the meter.

The inlet and outlet passages 50 and 52 of valve V may, if desired, be threaded to receive pipe fittings. In the present case, special flanges are employed for this purpose. Specifically, there is an elongated or elliptically shaped inlet flange 62 which is bolted to the inlet side of the meter body by means of a pair of bolts 64. The inlet flange 62 is provided with a circular ridge 66 which in turn bears against a suitable gasket in a mating circular groove at the end of the valve body. The discharge side of the valve is similarly provided with a flange 68 held in position by means of bolts 70.

The by-pass conduit B is connected at the point 72 with the meter body, this point leading into the inlet side of the meter. The by-pass then leads into the inlet flange 62 of valve V, then through valve V, and finally to a suitable nipple 74 leading into the side of the outlet passage of the meter. The inlet and outlet pressures are applied on opposite sides of diaphragm 32. A port 54 is provided through the valve body 20 because this is more convenient than to make a separate connection. On the other hand, for the outlet pressure, a special pipe 58 is used because in this case it is more convenient to use such a pipe than to attempt to provide complicated passages through the valve structure.

In the present case, the register R is of the dial or face-reading type. It may, however, be of the digit wheel type, or any other suitable construction. A knurled reset handle 80 is provided so that the dial may be set at zero when beginning a run.

A micrometric ratio adjusting device, or so-called "Microset" unit 82 is preferably provided between the meter and the register. This unit need not be described in detail, it being of the type disclosed in United States Letters Patent No. 2,079,197, issued to Charles P. Bergman, on May 4, 1937. The purpose of this adjusting device is to provide adjustment of the driving ratio between the meter and the register in order to regulate the accuracy of the register reading. The drive ratio between the meter and the register is selected to provide an accurate reading, allowing, of course, for the by-pass effect. The gearing between the meter and the register determines this ratio, but the adjusting unit 82 is desirable for even closer regulation of the accuracy of the meter.

It is important to understand that the action of the diaphragm controlled valve V is independent of the absolute pressure and is responsive solely to the differential pressure across the meter, which in turn is a function of the rate of flow through the meter. For example, the static pressure or head under which the fluid is delivered to the meter may be sixty pounds per square inch, the meter being, say, a three-inch meter having a capacity of, say, three hundred gallons per minute. The by-pass conduit may be built up of, say, half-inch piping. When the main control valve (not shown in the drawing, but ordinarily disposed beyond the discharge side of the meter, as, for example at a discharge nozzle) is opened fully, the pressure at the discharge side of the meter will fall to zero, but the differential pressure across the meter may be large, say, fifteen pounds per square inch, due to the rapid flow through the meter, say, three hundred gallons per minute. This large pressure differential readily closes the valve V, and there is no flow of liquid through the by-pass. If, however, the main control valve is turned down to limit the flow to, say, fifty gallons per minute, the pressure at the discharge side of the meter may rise to, say, thirty-five pounds per square inch, and the pressure on the inlet side of the meter may rise to, say, forty pounds per square inch. The differential pressure, however, has fallen to only five pounds per square inch, and this is inadequate to overcome the effect of the loading spring in valve V, and the valve is therefore opened. Liquid, therefore, flows through the by-pass.

I have so far ignored the meter error at very small rates of flow. For most commercial purposes, this is unimportant. A meter having a capacity of three hundred gallons per minute, for example, may be compensated with sufficient accuracy down to a flow as little as, say, twenty gallons per minute, and a large meter of this character is seldom used in a position where so small a flow is wanted. However, for rare cases in which further compensation at very small flow is desired, I simply add the check valve C in the by-pass conduit in series with the diaphragm operated valve V. The nature of the check valve will be clear from inspection of Fig. 4, it comprising a ball 90 resting on a seat 92 between the inlet 94 and outlet 96. A cap 98 affords access to ball 90. The check valve does not interfere with the normal operation of the by-pass, but at very small flow the differential pressure across the meter drops to so slight a value as to be incapable of lifting the ball 90, and the check valve then inhibits flow through the by-pass. The cut-off point of the check valve may be varied by changing the material of the ball, as, for example, from steel to brass, or from brass to aluminum. With a heavy oil, such as fuel oil for example, the meter will respond accurately to a very small flow, and in such case the cut-off point of the check valve may be lowered by using an aluminum ball. However, when dealing with a thin fluid, such as gasoline or kerosene, leakage error through the meter will appear at a somewhat higher rate of flow, and in such case the weight of the ball 90 may be increased.

The cut-off point for the main diaphragm valve V is, of course, accurately adjustable by means of the screw 38 which varies the loading of the spring 34 and therefore determines that differential pressure or flow rate at which the by-pass is closed.

It is believed that the construction and operation, as well as the many advantages of my improved compensated meter arrangement, will be apparent from the foregoing detailed description thereof. It will also be apparent that while I have shown and described my invention in a preferred form, many changes and modifications may be made in the structure disclosed without departing from the spirit of the invention defined in the following claims.

I claim:

1. A compensated meter arrangement comprising a liquid flow meter having inlet and outlet passages, a register driven thereby, a by-pass conduit communicating with said inlet and outlet passages, and pressure-controlled valve mechanism in said by-pass conduit, said valve mechanism including a diaphragm, means to apply the meter inlet pressure to one side of the diaphragm, means to apply the meter outlet pressure to the other side of the diaphragm, a loading spring bearing against one side of the diaphragm and tending normally to move the valve in one direction, whereby said valve is moved in that direction when the differential pressure across the meter is small, and is moved in the opposite direction when the differential pressure across the meter is large.

2. A compensated meter arrangement comprising a liquid flow meter having inlet and outlet passages, a register driven thereby, a by-pass conduit communicating with said inlet and outlet passages, and a pressure-controlled valve in said by-pass conduit, said valve including a movable diaphragm for opening or closing the valve, means to apply the meter inlet pressure to one side of the diaphragm, and means to apply the meter outlet pressure to the other side of the diaphragm, the arrangement being such that the valve is opened when the differential pressure across the meter is moderate, and is closed when the differential pressure across the meter is large, as at high flow rate.

3. A compensated meter arrangement comprising a liquid flow meter having inlet and outlet passages, a register driven thereby, a by-pass conduit connecting said inlet and outlet passages, and a pressure-controlled valve in said by-pass conduit, said valve including a diaphragm, means to apply the meter inlet pressure to one side of the diaphragm tending to close the valve, means to apply the meter outlet pressure to the other side of the diaphragm tending to open the valve, and a loading spring also tending to open the valve, whereby said valve is opened when the differential pressure across the meter is moderate, and is closed when the differential pressure across the meter is large, as at high flow rate.

4. A compensated meter arrangement comprising a liquid flow meter having inlet and outlet passages, a register driven thereby, means between said meter and register to micrometrically adjust the drive ratio therebetween, a by-pass conduit connecting said inlet and outlet passages, and a pressure-controlled valve in said by-pass conduit, said valve including a diaphragm, means to apply the meter inlet pressure to one side of the diaphragm tending to close the valve, means to apply the meter outlet pressure to the other side of the diaphragm tending to open the valve, and a loading spring also tending to open the valve, whereby said valve is opened when the differential pressure across the meter is moderate, and is closed when the differential pressure across the meter is large, as at high flow rate.

5. A compensated meter arrangement comprising a liquid flow meter having inlet and outlet passages, a register driven thereby, a by-pass conduit communicating with said inlet and outlet passages, and a pressure-controlled valve in said by-pass conduit, said valve including a diaphragm, means to apply the meter inlet pressure to the lower side of the diaphragm, means to apply the meter outlet pressure to the upper side of the diaphragm, and a loading spring bearing downwardly against the upper side of the diaphragm and tending normally to open the valve, whereby said valve is opened when the differential pressure across the meter is moderate, and is closed when the differential pressure across the meter is large, as at high flow rate.

6. A compensated meter arrangement comprising a liquid flow meter having inlet and outlet passages, a register driven thereby, a by-pass conduit communicating with said inlet and outlet passages, and pressure-controlled valve mechanism in said by-pass conduit, said valve mechanism being so arranged that the by-pass conduit is open when the differential pressure across the meter is moderate, but is closed when the differential pressure across the meter is either large as at high flow rate, or small as at very low flow rate, said valve mechanism including a diaphragm, means to apply the meter inlet pressure to one side of the diaphragm, means to apply the meter outlet pressure to the other side of the diaphragm, and a loading spring bearing against one side of the diaphragm and tending normally to move the valve in one direction.

7. A compensated meter arrangement comprising a liquid flow meter having inlet and outlet passages, a register driven thereby, a by-pass conduit communicating with said inlet and outlet passages, a pressure-controlled valve in said by-pass conduit, said valve including a diaphragm, means to apply the meter inlet pressure to one side of the diaphragm, means to apply the meter outlet pressure to the other side of the diaphragm, a loading spring bearing against one side of the diaphragm and tending normally to move the valve in one direction, whereby said valve is moved in that direction when the differential pressure across the meter is moderate, and is moved in opposite direction when the differential pressure across the meter is large, as at high flow rate, and a check valve disposed in said by-pass conduit in series with the aforesaid pressure-controlled valve, said check valve being so faced as to permit flow through the by-pass conduit between the inlet and outlet passages of the flow meter, the mass of the check in the check valve inhibiting flow through the by-pass conduit when the differential pressure across the meter becomes very small.

8. A compensated meter arrangement comprising a liquid flow meter having inlet and outlet passages, a register driven thereby, a by-pass conduit communicating with said inlet and outlet passages, a pressure-controlled valve in said by-pass conduit, said valve including a movable diaphragm for opening or closing the valve, means to apply the meter inlet pressure to one side of the diaphragm, means to apply the meter outlet pressure to the other side of the diaphragm, the arrangement being such that the valve is opened when the differential pressure across the meter is moderate, and is closed when the differential pressure across the meter is large, as at high flow rate, and a ball check valve disposed in said by-pass conduit in series with the aforesaid pressure-controlled valve, said ball check valve being so faced as to permit flow through the by-pass conduit between the inlet and outlet passages of the flow meter, the mass of the ball in said check valve being so selected as to inhibit flow through the by-pass conduit when the differential pressure across the meter becomes very small.

9. A compensated meter arrangement comprising a liquid flow meter having inlet and outlet passages, a register driven thereby, a by-pass conduit communicating with said inlet and outlet passages, a pressure-controlled valve in said by-pass conduit, said valve including a diaphragm, means to apply the meter inlet pressure to one side of the diaphragm to tend to close the valve, means to apply the meter outlet pressure to the other side of the diaphragm to tend to open the valve, and a loading spring bearing against the latter side of the diaphragm and tending to open the valve, whereby said valve is opened when the differential pressure across the meter is moderate, and is closed when the differential pressure across the meter is large, as at high flow rate, and a ball check valve disposed in said by-pass conduit in series with the aforesaid pressure-controlled valve, said ball check valve being so faced as to permit flow through the by-pass conduit between the inlet and outlet passages of the flow meter, the mass of the ball in said check valve being so selected as to inhibit flow through the by-pass conduit when the differential pressure across the meter becomes very small.

RAYMOND H. BARGE.